United States Patent [19]
Wier

[11] Patent Number: 5,988,680
[45] Date of Patent: Nov. 23, 1999

[54] PYROTECHNIC DRIVE, IN PARTICULAR FOR VEHICLE OCCUPANT RESTRAINT SYSTEMS

[75] Inventor: Franz Wier, Göggingen, Germany

[73] Assignee: TRW Occupant Restraint Systems GmbH, Alfdorf, Germany

[21] Appl. No.: 09/161,885

[22] Filed: Sep. 28, 1998

[30] Foreign Application Priority Data

Sep. 29, 1997 [DE] Germany .................. 297 17 367 U

[51] Int. Cl.⁶ .................. B60R 22/36; B64D 1/04; A47C 31/00
[52] U.S. Cl. .................. 280/806; 89/1.14; 102/360; 297/480
[58] Field of Search .................. 89/1.14; 102/360; 297/480; 280/805, 806

[56] References Cited

U.S. PATENT DOCUMENTS

| | | | |
|---|---|---|---|
| 3,280,566 | 10/1966 | Larue | 60/253 |
| 4,152,025 | 5/1979 | Bendler et al. | 297/386 |
| 5,407,148 | 4/1995 | Ono et al. | 242/374 |
| 5,421,264 | 6/1995 | Petrick | 102/443 |
| 5,553,890 | 9/1996 | Buhr et al. | 280/806 |

*Primary Examiner*—Charles T. Jordan
*Assistant Examiner*—Jeff Howell
*Attorney, Agent, or Firm*—Tarolli, Sundheim, Covell, Tummino & Szabo

[57] ABSTRACT

A pyrotechnic drive, in particular a linear drive for vehicle occupant restraint systems comprises a cylinder having a cylinder wall and a working space, a piston which together with the cylinder wall delimits the working space, and several pyrotechnic propellant charges producing gas. The gas reaches the working space and thereby sets the piston in motion relative to the cylinder. The propellant charges are ignited staggered in time relative to each other and comprise a first propellant charge integrated in the piston and a second propellant charge connected with the cylinder wall.

10 Claims, 2 Drawing Sheets

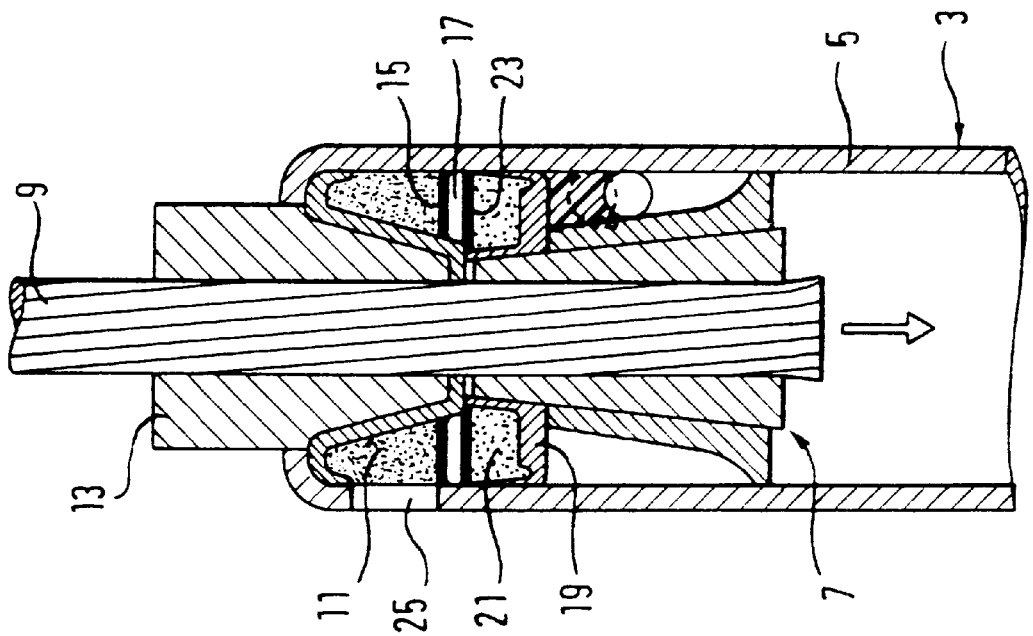

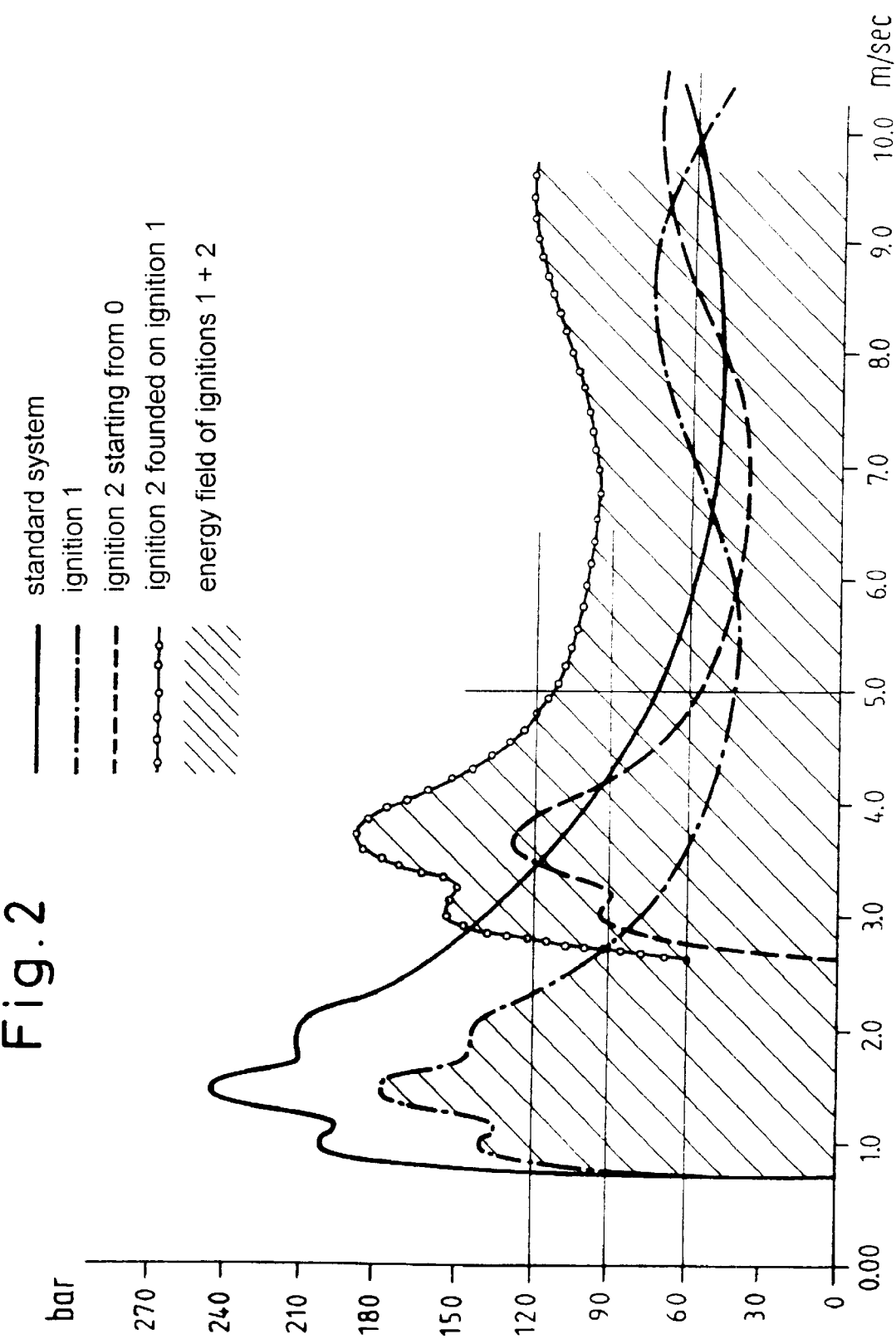

PYROTECHNIC DRIVE, IN PARTICULAR FOR VEHICLE OCCUPANT RESTRAINT SYSTEMS

TECHNICAL FIELD

The invention relates to a pyrotechnic drive, in particular a linear drive for vehicle occupant restraint systems.

BACKGROUND OF THE INVENTION

In pyrotechnic drives, in particular linear drives, which form part of a belt tensioner system, the problem exists that a higher drive power can not be achieved simply by more powerful propellant charges. This lies on the one hand in the limited mechanical loading capacity of all parts of the drive, for example of seals or of a piston rod. On the other hand, as was discovered, with too high an energy suddenly becoming free, a majority of this energy remains unused through deformation of parts of the drive.

From DE 44 15 373.2 it is known to provide two propellant charges which are separated from each other by a bursting membrane, the propellants of which have different deflagration rates and are ignited successively. Thereby, the peak loads to which the parts of the drive are exposed can be reduced and a smaller initial pressure rise can be achieved. In the known drive, the problem exists that owing to the encapsulating of the propellant charges one inside the other, owing to the principle only, a relatively small staggering in time is possible between the igniting and the burning up of the propellant charges. A portion of the gas which is produced on deflagration of the propellant associated with the first propellant charge, arrives into the space taken up by the second propellant charge and thereby relatively late at the outflow opening. In addition, the space taken up by the known drive is relatively large.

BRIEF SUMMARY OF THE INVENTION

The invention provides a pyrotechnic drive which is distinguished by a smaller necessary structural space. In addition, the pyrotechnic drive according to the invention makes possible a greater staggering in time between the igniting of the propellant charges. Furthermore, the initial pressure rise is kept small, because the propellant charges do not influence each other to the extent which was the case in the known drive. The pyrotechnic drive according to the present invention comprises a cylinder having a cylinder wall and a working space, a piston which together with the cylinder wall delimits the working space, and several pyrotechnic propellant charges producing gas. The gas reaches the working space and thereby sets the piston in motion relative to the cylinder. The propellant charges are ignited staggered in time relative to each other and comprise a first propellant charge integrated in the piston and a second propellant charge connected with the cylinder wall.

The gas which is produced by the propellant charge which is ignited first can thereby flow unimpeded from the other propellant charge into the working space and lead to the driving of the piston. As the gas produced during the deflagration of the propellant charge which is ignited later does not have to flow through the first propellant charge, which is ignited first, the deflagration processes occur almost uninfluenced by each other. When the hot gas, which is produced by a propellant charge, is to bring about the ignition of the other propellant charge, a greater staggering in time can be achieved between the two moments of ignition because of this concept and a relatively high pressure level can be achieved in the working space over a longer period of time. This provides for a relatively uniform drive without extreme peak loads.

According to the preferred embodiment, the propellant charge provided in the working space and the propellant charge provided in the piston in the non-activated state of the drive are spaced apart from each other, whereby the moments of ignition are staggered in time still further with respect to each other.

To achieve a uniform pressure, which lasts as long as possible, in the working space the propellants of the propellant charges have different combustion speeds and/or different ignition temperatures.

As already explained, the propellant charges can partially ignite each other, so that only one igniter has to be provided, which ignites one propellant charge.

Through the provision of at least one destructible wall between the propellant charges, the moments of ignition can be staggered in time with respect to each other in a predeterminable manner and within tight limits.

DETAILED DESCRIPTION OF THE DRAWINGS

FIG. 1 shows a longitudinal sectional view through an embodiment of the pyrotechnic drive according to the invention, in the form of a linear drive of a belt tensioner, and FIG. 2 shows various evolutions of pressure inside the working space, inter alia the evolution of pressure which is able to be achieved by the drive according to the invention.

DETAILED DESCRIPTION OF A PREFERRED EMBODIMENT

In FIG. 1 a linear drive for a belt tensioner is illustrated as part of a vehicle occupant restraint system. The drive comprises a cylinder 3 with a cylinder wall 5, a multipart piston 7 arranged inside the cylinder 3, and a traction cable 9 which is connected with the piston 7 and emerges from the cylinder 3 on the end face. A working space is partially filled by a first propellant charge 11, which space is delimited by the cylinder wall 5, a seal 13 for the traction cable and a wall 15. Between the wall 15 and the piston 7 a gap is provided, which forms the effective working space 17. A disc-shaped part 19 of the piston 7 adjoins the effective working space 17. The disc-shaped part 19 is constructed so as to be hollow, with the cavity being filled, in a space-saving manner, by a second propellant charge 21. A further wall 23 seals the second propellant charge 21 against the working space 17. An igniter is not shown, which communicates via an opening 25 in the cylinder wall 5 with the first propellant charge 11, so that it can ignite the latter in the case of restraint. The propellant of the first propellant charge 11 has a higher combustion rate than the propellant of the second propellant charge 21 and also a lower ignition temperature. The walls 15, 23 consist of a combustible foil which is destroyed on deflagration of propellant.

In the case of restraint, firstly the first propellant charge 11 is ignited, and the produced gas, after destruction of the wall 15, flows into the effective working space 17. Thereby, the piston 7 is accelerated in the arrow direction. Through the hot gases and hot particles which occur, the wall 23 is destroyed and the second propellant charge 21 is ignited, staggered in time with respect to the first propellant charge 11. The gas produced by the deflagration of the propellant of the second propellant charge 21 likewise arrives into the working space 17 and leads to the acceleration of the piston 7. Owing to the chronologically greatly staggered ignitions of the propellant charges 11, 21 and owing to the different deflagration speeds, a relatively gentle start-up of the piston 7 is achieved. In addition, the working space 17 increases on deflagration of the propellant, because the space occupied by the propellant communicates with the effective working space 17 and on deflagration itself becomes the working space. Furthermore, a gentle start-up is also achieved through the use of propellant charges with the same deflagration speed.

In FIG. 2 various evolutions of pressure in the working space are illustrated. A continuous line represents in simplified form the evolutions of pressure in the working space with a drive which has a very powerful propellant charge. Dot-and-dash lines and broken lines represent the evolutions of pressure which would arise through the ignition of the first propellant charge 11 or of the second propellant charge 21 alone. The evolution of pressure in the working space of the drive according to the invention therefore results from the sum of the evolutions of pressure, brought about by the two individual propellant charges, i.e. from the front part of the dot-and-dash curve and the dotted curve following thereto. The energy field under the resulting curve is represented by hatching. The comparison with the drive with a powerful propellant charge shows that the peak pressure and hence the maximum loading on the individual parts of the drive is less. The energy available for the drive, however, is kept longer at a high level, whereby a uniform acceleration of the piston can be achieved, which is very advantageous in particular in the case of drives for long tensioning paths.

The propellant charge which is ignited first can positively be distinctly weaker than the subsequently ignited propellant charge. The initial, hence relatively small, acceleration leads to smaller inertia forces and smaller partial load. Only through ignition of the second propellant charge is the maximum acceleration then reached.

I claim:

1. A pyrotechnic drive, in particular a linear drive for vehicle occupant restraint systems, said drive comprising a cylinder having a cylinder wall and a working space located within said cylinder, a piston which together with said cylinder wall delimits said working space, and several pyrotechnic propellant charges producing gas, which reaches said working space and thereby sets said piston in motion relative to said cylinder, said propellant charges being ignited staggered in time relative to each other and comprising a first propellant charge integrated in said piston and a second propellant charge connected with an inner side of said cylinder wall.

2. The pyrotechnic drive according to claim 1, wherein said second propellant charge is provided in said working space.

3. The pyrotechnic drive according to claim 1, wherein said propellant charges provided in said working space and in said piston in a non-activated state of said drive are spaced apart from each other.

4. The pyrotechnic drive according to claim 1, wherein said propellant charges have different combustion rates.

5. The pyrotechnic drive according to claim 1, wherein said propellants of said propellant charges have different ignition temperatures.

6. The pyrotechnic drive according to claim 1, wherein an igniter is associated with one of said propellant charges and another propellant charge is ignited by a deflagration of the one propellant charge.

7. The pyrotechnic drive according to claim 1, wherein said propellant charges are separated from each other by at least one wall which can be destroyed on deflagration of at least one of said propellant charges.

8. The pyrotechnic drive according to claim 7, wherein said wall seperates a said cavity in said piston, in which one of said propellant charges is provided, from said working space.

9. The pyrotechnic drive according to claim 7, wherein said wall seperates said second propellant charge, provided in said working space, from a part of said working space not occupied by said propellant charge.

10. The pyrotechnic drive according to claim 7, wherein said wall is a foil.

* * * * *

UNITED STATES PATENT AND TRADEMARK OFFICE
CERTIFICATE OF CORRECTION

PATENT NO. : 5,988,680
DATED : November 23, 2000
INVENTOR(S) : Franz Wier

It is certified that error appears in the above-identified patent and that said Letters Patent is hereby corrected as shown below:

Title page,
Item 73, Assignee, replace "TRW Occupant Restraint Systems GmbH" with
-- TRW Occupant Restriant Systems GmbH & Co. KG --.

Signed and Sealed this

Eighteenth Day of September, 2001

*Attest:*

NICHOLAS P. GODICI
*Attesting Officer*   *Acting Director of the United States Patent and Trademark Office*